United States Patent [19]

Cicognani et al.

[11] 4,371,363
[45] Feb. 1, 1983

[54] TOOTHED BELT

[75] Inventors: Mario Cicognani, Milan; Giorgio Tangorra; Gianfranco Cimatti, both of Monza, all of Italy

[73] Assignee: Industrie Pirelli S.p.A., Milan, Italy

[21] Appl. No.: 149,157

[22] Filed: May 14, 1980

[30] Foreign Application Priority Data

May 25, 1979 [IT] Italy ............... 22973 A/79

[51] Int. Cl.³ .............................................. F16G 1/28
[52] U.S. Cl. .................................................. 474/205
[58] Field of Search ............. 474/204, 205, 250, 251

[56] References Cited

U.S. PATENT DOCUMENTS

| | | | |
|---|---|---|---|
| 2,167,384 | 7/1939 | Freedlander | 474/250 |
| 2,211,202 | 8/1940 | Freedlander | 474/250 |
| 3,535,946 | 10/1970 | Miller | 474/205 |
| 3,621,727 | 11/1971 | Cicognani | 474/205 |
| 3,756,091 | 9/1973 | Miller | 474/205 |
| 3,924,481 | 12/1975 | Gregg | 474/205 |

FOREIGN PATENT DOCUMENTS 864204  2/1970  Italy ................................. 474/205

Primary Examiner—Lawrence J. Staab
Attorney, Agent, or Firm—Stevens, Davis, Miller & Mosher

[57] ABSTRACT

An endless flexible, elastomeric or plastic power transmission belt has a series of outwardly projecting, longitudinally spaced teeth having bases integral with the belt body and an opposite free end for meshing with teeth of a pulley. The free end of each tooth is smaller in longitudinal dimension than the base and the surfaces facing adjacent teeth of the series are curved outwardly toward the adjacent teeth. The curvature is defined by the trigonometric tangent of the angles between a straight line tangent to the curvature and a straight line parallel to the base. The trigonometric tangent increases linearly from the free end of the tooth towards the base according to a constant coefficient that is a function of the mechanical characteristics of the material from which the belt is made and the dimensions of the tooth.

7 Claims, 3 Drawing Figures

TOOTHED BELT

This invention relates to a toothed belt, i.e., a power transmission belt having teeth on one of its faces, for meshing with the teeth of toothed pulleys, for forming a toothed-belt pulley power transmission system.

One of the major problems with a toothed belt is its relatively short service-life and consequently the necessity to prolong the service-life of a toothed-belt and pully power transmission assembly to at least as long as the life of commonly known toothed gear power transmission systems.

A second problem which is manifested in 'known' toothed belts, is that it is difficult to reduce the overall dimensions of the transmission assembly because it is not feasible to reduce the pitch of the toothed belt to substantially less than 8 mm.

Various types of "known" toothed belts having a variety of tooth profiles have been proposed for solving the first problem.

In fact, some of these "known" toothed belts have a rectilineal profile, i.e., a profile which is identical to that of a rack of a rack-gear transmission.

These types of toothed belts vibrate excessively and have an unsatisfactorily short service life, although this service life is notably increased by applying contrivances, such as covering the toothing of the toothed belt with special types of fabrics and/or having special textile structures for the coverings.

The unsatisfactory service life of the toothed belts having teeth with a rectilineal profile is due to the hypothesis on which the teeth and their profile are designed. Such hypothesis which is not entirely true, is that such teeth are rigid, i.e., just as if they were made of a metallic material.

Based on this hypothesis, also toothed belts have been provided with an involute profile like that of commonly used metallic gears, and due to this fact, it has not been possible to increase the service life of the toothed belts, nor to reduce the vibrations involved.

Another type of 'known' toothed belt has teeth which have a profile formed by arcs of a circle. This belt has been designed with recognition that the elastomeric belt teeth are all deformable in substantially the same way, even when the mechanical characteristics of the elastomer employed for the teeth is varied because the difference in deformability is considered negligible in comparison with the deformability of the teeth of an undeformable metallic toothed pulley. Even though the service life of the elastomeric toothed belts is increased in this way with respect to the toothed belts having teeth with a rectilineal profile, this increase in service life is not entirely satisfactory. Besides this, even the toothed belts with teeth having a profile formed by arcs of a circle vibrate when used under the working conditions of power transmission.

Moreover, many other types of toothed belts are 'known' which can be differentiated from each other because of their teeth having a curved profile that is formed by combining tracts of arcs of a circle with rectilineal tracts and with involute profile tracts, but even these 'known' belts have an unsatisfactory service life, and are subjected to vibrations when employed in transmission systems. No successful means for solving the problem of vibration has been made up to this time.

An object of the present invention is to provide a toothed belt that is devoid of the drawbacks of the 'known' toothed belts and therefore, that has an improved service life and does not vibrate in a transmission system.

Another object of the present invention, is to provide a toothed belt that can enable reduction in dimensions of power transmission systems.

Other objects will become apparent from the following description with reference to the accompanying drawing wherein FIG. 1 illustrates a length of one embodiment of the belt of the invention in longitudinal section;

The foregoing objects and others are accomplished in accordance with this invention, generally speaking, by providing an endless elastomeric or plastic toothed belt for meshing with a toothed pulley in a power transmission system which belt has a plurality of substantially parallel and coplanar cords embedded therein which are disposed longitudinally on the belt and a series of sapced teeth on at least one surface of the belt each having a curved profile in which the trigonometric function of the angles between the straight lines which are tangent to the curve and the straight lines which are parallel to the base of the tooth increases linearly from the tooth top (apex) to the base of the tooth according to a constant coefficient that is a function of the mechanical characteristics of the material from which the tooth is made and the dimensions of the tooth.

Figure 1:
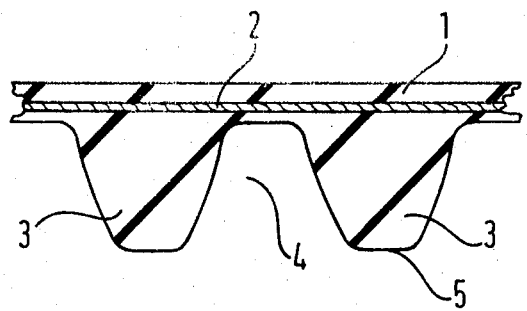

Referring now to FIG. 1, the toothed belt has an elastomeric endless body 1 having a traction resistant insert comprising a plurality of embedded laterally spaced, substantially coplanar reinforcing, flexible and substantially inextensible polyester cords 2 disposed longitudinally therein and substantially parallel to each other. Alternately, any other suitable synthetic cord such as nylon or the like may be substituted for the polyester cord.

A series of spaced elastomeric teeth 3, separated from one another by hollow spaces 4, extends along one face of body 1.

The surface 5 of the teeth 3 and of the hollow spaces 4 may be covered with a protective fabric or the like.

In those embodiments having a covering 5, the covering is preferably two fabrics doubled up together with an intermediate layer of elastomeric material. The outermost layer of covering 5 is self-lubricating fabric such as the self-lubricating fabric disclosed in Italian Pat. No. 864,204 and the corresponding U.S. Pat. No. 3,621,727.

The fundamental characteristic of the toothed belt provided by the present invention, and apart from the fact of whether or not the surfaces of the teeth and the hollow spaces are covered, is that the profiles of the belt teeth are curves, defined by having the trigonometrical tangent of the angles $\alpha$ formed by the straight lines tangent to the curve with the straight line intersecting the curve parallel to the base of the teeth, increase linearly according to a coefficient (defined further on herein), proceeding from the top or apex of the tooth towards the tooth base.

The curves of the belt teeth of the invention, are parabolic arcs, and with a sufficient approximation, can even be an arc of an ellipse.

As stated above, the layouts of the curves depends upon a coefficient. This coefficient for a pre-established type of elastomeric compound forming the teeth, and for a given dimension for the teeth (i.e. width and height of tooth), assumes a constant value.

This coefficient is determined by the following formula, determined by way of experiment:

$$K = 32h/(A+4\delta)^2$$

where:
K is a coefficient of constant value indicating the linear increase which must have the value of a trigonometric tangent of the angle α (between the tangent of the curve which defines the tooth profile and a straight line parallel to the tooth base) proceeding from the top of the tooth towards the tooth base;
h is the tooth height;
A is the width of the tooth base;
δ is a parameter that depends upon the material forming the teeth, which responds to the following definition:

$$\delta = \beta(h\tau max/G)$$

where:
β is a dimensionless number between: 0.1 and 1;
τmax. is the maximum admissible fatigue shearing stress of the material forming the teeth;
G is the global average shear modulus for the material forming the teeth.

In particular, the coefficient β depends upon the elastomer used to make the belt and upon the omonogeneous composition of the elastomeric material selected.

Figure 3:
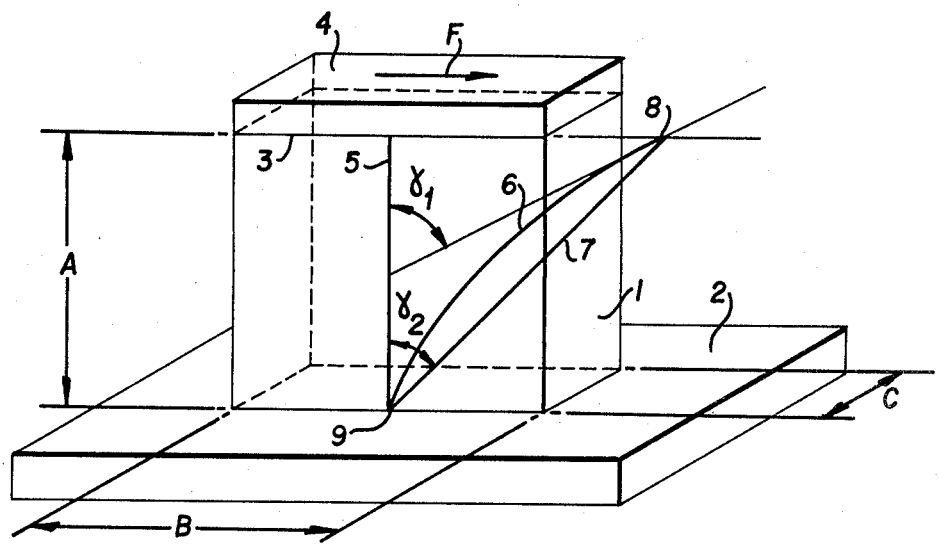
FIG. 3 is a perspective view of a prismatic body from which $\beta$ of the formula used to determine the perameter $\delta$ is determined.

After the composition of the elastomeric material has been determined, a prismatic body of the type illustrated in FIG. 3 is made. The prismatic body has a height A, and a width B which is the average width of the tooth of the belt. The thickness C of the prismatic body is equal to one centimeter. The bottom 1 is firmly fixed to a stiff support member 2 through its base 3 to a plate 4 of rigid material.

In order to determine the value β a force F is applied to the top of the prismatic body. This force is the maximum tangential force expected to be applied to the tooth of the belt. Under such a force the axis 5 of the non-deformed prismatic body deforms and assumes the form represented by line 6 which is the stress-strain curve of the prismatic block. Rectalinear line 7 of FIG. 3 is constructed by joining point 8 of the end of line 6 with the point 9 of line 6. The resulting line is a stress-strain curve. The trigonometric tangent of the maximum angle is between the geometrical tangents of the curves 6 and the non-deformed axis of the prismatic body, or in other words, line 5. The angle δ, of the prismatic body illustrated in FIG. 3 is the maximum angle and the trigonometrical tangent of $\delta_2$ is between line 7 and line 5. The ratio between the trigonometric tangents of angle $\delta_2$ and the trigonometrical tangent of $\delta_1$ is β. One building the belt then takes into consideration how the belt will be used and can vary the value β taking into account that the smaller the coefficient is, the safer its use and the longer its lifetime. In other words, the β coefficient is determined in the above way and is a safety coefficient to take into account the larger or smaller homogeneity of the composition from which the belt is made.

Figure 2:
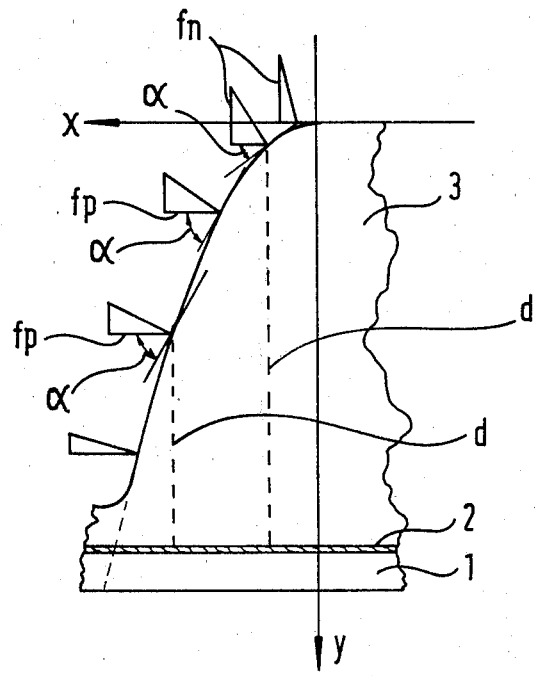
FIG. 2 is an enlarged fragmentary view of the profile of one tooth.

Reference is now made by way of example, to a toothed belt provided by the present invention, on the basis of which there have been carried out experimental tests for determining the useful-life and the 'noiselessness' (absence of vibrations), of the toothed belt-and-pulley transmission where, obviously, for the pulley teeth there has been chosen a profile that mates with the belt profile (not described here, but which can be determined in a conventional way by one skilled in the art). For the toothed belt, there was selected as a tooth profile, the parabola illustrated in FIG. 2, and defined by the following formula:

$$y = \frac{16h}{(A + 4\delta)^2} x^2$$

wherein the various symbols of the formula have the above meanings, and where the reference-axes 'x' and 'y' meet in correspondence of the tooth-top.

The other characteristics of the toothed-belt of the present invention, are as follows:

|   |   |   |
|---|---|---|
|   | PITCH | 8 mm |
| h = | TOOTH HEIGHT | 3.5 mm |
| A = | WIDTH OF TOOTH-BASE | 5.5 mm |
|   | LAYOUT | 1088 mm |
|   | TOOTHING MATERIAL | chloroprene rubber |
|   | TRACTION-RESISTENT INSERT | fibreglass cords. |
|   | MATERIAL FOR COVERING | nylon fabric |

The experimental tests were carried out under the following conditions. Regarding the ENDURANCE TEST—this was carried out by mounting the toothed belt on a pair of toothed pulleys, where the driving pulley had a pitch diameter of 61.12 mm, the driven pulley had a pitch diameter of 122.23 mm, and where there was present an idler formed by a roller having a diameter of 60 mm.

The tension, at which the belt was loaded, was 250 Newtons, and transmission was achieved by rotating the driving pulley at a speed of 6000 revolutions per minute, and by applying to the driven pulley a braking load of 30 Newtons per meter.

This test was carried out in an air atmosphere where the temperature was 40° C. and the relative humidity was 60%.

Regarding the TOOTH-SKIPPING RESISTENCE TEST—this was effectuated with the transmission described above for the Endurance Test, but the driven pulley was 'blocked', and torques with increasing values were applied by means of a dynamometrical wrench to the driving pulley.

With regard to the NOISE TEST—the velocity of the driving pulley was varied within the range of 1000 to 6000 revolutions per minute.

Under these identical conditions, experimental tests were carried out with toothed belts having similar characteristics as those of the toothed belts of the invention described above but with the exception that the teeth had a profile with rectilineal sides which meshed with toothed pulleys having teeth mating with those of the rectilineal sides.

The results obtained from these experiments, were as follows.

As regards the belt's "soundlessness", the sound level of the toothed belt of the invention was from 5 to 10 decibels less than that of the prior art belt in the range of frequency examined.

The service life of the belt of the invention was about 1.9 times that of the prior art belt.

The resistance of the belt of the invention to tooth skipping phenomena with respect to the pulley teeth is from 30% to 50% less than that of the 'known' type of toothed belts.

Moreover, on the basis of experimental tests, it has been found that with the toothed belts of the invention, the toothing pitch can be between 2.5 mm and 25 mm—i.e., it can assume a minimum value (2.5 mm) which is considerably smaller than the minimum value of 8 mm required in the prior art toothed belts.

This fact allows for manufacturing toothed belts having a layout between 50 mm and 5000 mm, and with a ratio between the 'h' and the 'A' (i.e., tooth height and width at tooth base) between 0.57 to 1 and 1.2 to 1, and with the ratio between the width 'A' at the tooth base and the pitch of the toothing, being between 0.5 and 0.75.

The achievement of the objects of the invention demonstrated by experimental data, is difficult to explain; but it may be feasibly justified by the following considerations.

During the motion of the transmission between the toothed-belt and the toothed pulley, the belt teeth mesh with the pulley teeth, and during this meshing the belt teeth transmit and/or receive from the pulley, mechanical stresses, the results of which are constituted by forces and moments.

In contrast to the pulley toothing, the teeth of an elastomeric toothed belt are deformable. This deformability depends not only upon the particular elastomeric material used for the construction of the teeth, but also depends upon the dimension involved (i.e., tooth height and tooth base width).

It follows from this that on varying the point of application of the force upon the belt tooth, there also occurs a variation in the deformation of the tooth belt.

The variation in the tooth deformation in the belt, happens in a way that deformation is reduced.

Gradually, as the point of application of the force applied on its shifts from the top of the tooth to the base of the tooth, this is both, because the tooth is more deformable at the top and less deformable at the tooth base, as well as because the linking together of the belt tooth to the corresponding pulley tooth, assumes its maximum value when the tooth is entirely engaged.

The use, for the belt tooth profile, of a particular curve defined by having the trigonometrical tangent of the angle α of a value increasing linearly when proceeding from the tooth top to the tooth base, and constructed by taking into account the deformability of the tooth, due both, to the type of material employed, and to the height and width of the tooth, allows the distance "d" between the point of applying the force and the tooth base to diminish linearly, just as the tooth gradually deforms.

Moreover, the use of the curve in question, for the tooth profile, allows the component "fp" of the force applied by the pulley to the belt tooth, in the direction parallel to the base to increase linearly when proceeding from the tooth top towards the tooth base.

The result is that the moment on the belt when engaged with the pulley tooth (that is given by the product of the force "fp" and the distance "d") is maintained constant, and thus does not impart vibrations to the belt.

Another reason which could explain this absence of vibrations in the toothed belt of the invention, and also its long useful life, is probably the following.

During the meshing of the belt teeth with the pulley teeth, a plurality of teeth mesh one with the other; but the stresses to which the belt teeth are subjected when meshed with the pulley teeth are probably unequally distributed among them, owing to the deformability of the belt teeth. Besides this, moreover, the intensity of the force applied to each belt tooth, probably increases during meshing.

More particularly, the force that one pulley tooth transmits to one belt tooth that is engaged with it, increases in intensity gradually, as the point of application of the force shifts from the tooth top to the tooth base.

Because of the particular curve adopted for the profile of the belt toothing, the straight line along which the force is applied to the tooth, becomes inclined still more towards the line parallel to the tooth base. As a consequence of this, even should the intensity of this force increase, the value of the normal component force "fn" perpendicular to the tooth base, is maintained constant (whereas the component "fp" increases in accordance with a linear trend).

The constancy of the value of the normal component of the force applied to the belt tooth, thus eliminates any vibrations originating in the belt and, as a consequence of this fact, the useful life of the belt is prolonged.

Although the invention has been described in detail to illustrate the invention, it is to be understood that such detail is solely for that purpose and those skilled in the art can make variations therein without departing from the spirit and scope of the invention except as it is limited by the claims.

What is claimed is:

1. A toothed belt for meshing with a toothed pulley of a power transmission system comprising: an endless elastomeric or plastic tape, a plurality of parallel and coplanar cords embedded in the tape and disposed along the larger dimension of the tape, and a toothing on at least one face of said tape, the said toothing being formed by a plurality of teeth, separated one from the other by hollow spaces, characterized by the fact that the profile of each tooth is a curve defined by the trigonometric tangent of the angles formed between the straight lines tangent to the curve and the straight line parallel to the tooth base that increase linearly from the tooth top towards the tooth base, and according to a constant coefficient (K) that is a function of the mechanical characteristic of the material forming the tooth and of the dimensions of the tooth calculated from the formula:

$$K = 32h/(A+4\delta)^2$$

where:
K is the coefficient constant;
A is the width of th tooth base;
h is the height of the tooth;
δ is a coefficient as a function of the maximum admissible shearing stresses of the material forming the tooth and of the average modulus of the shear stresses of the material that constitutes the tooth.

2. A tooth belt according to claim 1, characterized by the fact that the coefficient δ, corresponds to the formula:

$$\delta = \beta(h\zeta max/G)$$

wherein:

β is between 0.1 and 1 and is determined by applying a vertical force against a prismatic member of predetermined dimensions fixed to a supporting base which force is substantially equal to the maximum tangential load to be applied against a tooth of the belt to deform the tooth and determine a stress-strain curve of the prismatic member.

3. A toothed belt according to claim 1, characterized by the fact that the profile of the teeth of the toothed belt is an arc of a parabola.

4. A toothed belt according to claim 3, characterized by the fact that the profiles of the teeth of the toothed belt, are arcs of a parabola responding to the formula:

$$y = \frac{16h}{(A + 4\delta)^2} x^2$$

wherein x and y represent the axes of the tooth with the point of intersection of the axes thereof being at the top of the tooth.

5. A toothed belt according to claim 1, characterized by the fact that the profile for the teeth of the toothed belt is an arc of an ellipse.

6. In an endless, flexible power transmission belt having a series of spaced teeth along one surface thereof for meshing with teeth of a pulley, the improvement wherein each tooth of the series has a base integral with the remainder of the belt and projects outwardly therefrom, an opposite free end of smaller longitudinal dimensions than that of the base, and an outwardly curved substantially arcuate shaped surface facing each of the adjacent teeth in the series which extends between the base and said opposite end, the curvature of said arcuate shaped surface being a function of the mechanical characteristics of the composition of the material and of the dimensions of the tooth and defined by the trigonometric tangent of the angles formed between a straight line tangent to the curve and a straight line parallel to the base, said trigonometric tangent increasing linearly from said opposite end, and according to a constant coefficient (K) determinable from the formula:

$$K = 32h/(A + 4\delta)^2$$

wherein:

K is the coefficient of constant value indicating the linear increase which must have a value indicating the linear increase of the angle between the tangent of the curve which defines the tooth profile and a straight line parallel to the tooth base;

A is the width of the tooth base;

h is the height of the tooth; and

δ is a coefficient determined as a function of the maximum admissible shearing stress and of the average modulus of the shear stresses of the material from which the tooth is made.

7. A toothed belt for meshing with a toothed pulley of a power transmission system according to claim 1 comprising: an endless elastomeric or plastic tape, a plurality of parallel and coplanar cords embedded in the tape and disposed along the larger dimension of the tape and a toothing on at least one face of said tape, the said toothing being formed by a plurality of teeth separated one from the other by hollow spaces, characterized by the fact that each tooth comprises a flat top and flanks whose profiles are curves defined by the trigonometric tangent of the angles formed between the straight lines tangent to the curve and the straight line parallel to the tooth base that increases linearly from the tooth top towards the tooth base, and according to a constant coefficient (K) that is a function of the mechanical characteristic of the material forming the tooth and of the dimensions of the tooth calculated from the formula of claim 1.

* * * * *